(12) United States Patent
Dziuba et al.

(10) Patent No.: US 10,300,831 B2
(45) Date of Patent: May 28, 2019

(54) HYBRID REEFER SYSTEMS

(71) Applicant: Cummins Inc., Columbus, IN (US)

(72) Inventors: Robert Dziuba, Columbus, IN (US);
Nazar Al-Khayat, Scottsdale, AZ (US);
Mahesh Madurai Kumar, Columbus, IN (US); Gary L. Parker, Columbus, IN (US); Subbarao Varigonda, Columbus, IN (US); Jaroslaw Leonarski, Columbus, IN (US); Vivek A. Sujan, Columbus, IN (US);
Bradford K. Palmer, Ham Lake, MN (US); William Brent Fields, Seymour, IN (US); John P. O'Brien, Oakham (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/610,819

(22) Filed: Jun. 1, 2017

(65) Prior Publication Data
US 2017/0349078 A1 Dec. 7, 2017

Related U.S. Application Data

(60) Provisional application No. 62/344,217, filed on Jun. 1, 2016.

(51) Int. Cl.
| | | |
|---|---|---|
| *B60P 3/20* | (2006.01) | |
| *B62D 59/04* | (2006.01) | |
| *B60H 1/32* | (2006.01) | |
| *B60H 1/22* | (2006.01) | |
| *B60H 1/00* | (2006.01) | |
| *B60L 1/00* | (2006.01) | |
| *B60L 1/02* | (2006.01) | |
| *B60L 11/12* | (2006.01) | |

(52) U.S. Cl.
CPC ............ *B60P 3/20* (2013.01); *B60H 1/00428* (2013.01); *B60H 1/00735* (2013.01); *B60H 1/00878* (2013.01); *B60H 1/2215* (2013.01); *B60H 1/3222* (2013.01); *B60H 1/3232* (2013.01); *B60L 1/003* (2013.01); *B60L 1/02* (2013.01); *B60L 11/123* (2013.01); *B62D 59/04* (2013.01); *B60L 2200/28* (2013.01); *B60L 2210/40* (2013.01); *Y02T 10/6217* (2013.01); *Y02T 10/7005* (2013.01); *Y02T 10/7077* (2013.01); *Y02T 10/7241* (2013.01); *Y02T 10/88* (2013.01); *Y10S 903/903* (2013.01)

(58) Field of Classification Search
CPC ...... H02J 7/00; B60P 3/20; B60L 1/00; B60L 11/1809; B60H 1/00735
See application file for complete search history.

(56) References Cited

U.S. PATENT DOCUMENTS 6,223,546 B1 * 5/2001 Chopko ............... B60H 1/3232
62/243
6,889,762 B2 5/2005 Zeigler et al.
(Continued)

*Primary Examiner* — James A Shriver, II
*Assistant Examiner* — James J Triggs
(74) *Attorney, Agent, or Firm* — Taft Stettinius & Hollister LLP

(57) ABSTRACT

Hybrid power systems include an internal combustion engine and a motor/generator connectable with the engine. A reefer unit is configured to receive power from the motor/generator via a reefer power system that includes an export power inverter and an energy storage device.

19 Claims, 9 Drawing Sheets

(56) References Cited

U.S. PATENT DOCUMENTS

| | | |
|---|---|---|
| 7,673,466 B2 | 3/2010 | Pacy |
| 7,690,456 B2 | 4/2010 | Deng et al. |
| 7,825,530 B2 | 11/2010 | Schulte et al. |
| 8,825,242 B2 | 9/2014 | Foster |
| 8,860,243 B2 | 10/2014 | Hering et al. |
| 2009/0079161 A1 | 3/2009 | Muchow et al. |
| 2010/0154449 A1 | 6/2010 | Stover, Jr. et al. |
| 2010/0229581 A1 | 9/2010 | Truckenbrod et al. |
| 2011/0025267 A1* | 2/2011 | Kamen .................. B60L 8/003 320/109 |
| 2011/0110791 A1* | 5/2011 | Donnat ................ B60H 1/3232 417/18 |
| 2011/0248563 A1 | 10/2011 | Komma et al. |
| 2016/0272048 A1* | 9/2016 | Casasanta ............... B60L 1/003 |

\* cited by examiner

HYBRID REEFER SYSTEMS

BACKGROUND

Refrigerated (reefer) trucks and trailers are typically cooled by a separate refrigeration or reefer unit, such as a diesel reefer unit. In one example, the reefer unit includes a diesel engine that powers a compressor to cool the trailer. These reefer units are typically operating continuously or at various intervals depending on conditions to maintain certain temperature conditions in the trailer.

Reefer units include various loads in addition to the compressor/evaporator. Examples include loads like fans, resistive heaters, lights and a mixture of single phase and three phase loads. In addition, various compressor technologies for the reefer unit are possible, including reciprocating type and scroll type compressors. The most significant part of the load is typically the compressor/evaporator of the reefer unit.

Current and possible future regulations for emission and noise levels, as well as fuel savings benefits, make utilization of regenerative capacity in powering reefer units more attractive. Therefore, integrated approaches for reefer units that provide flexibility and efficiency are needed.

DISCLOSURE

For the purposes of clearly and concisely describing example embodiments of the invention, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art to which the invention relates.

SUMMARY

Unique apparatuses, methods and systems for hybrid reefer systems are disclosed. Certain example embodiments include a hybrid power system with an internal combustion engine and a motor/generator selectively connectable with the engine, and a reefer unit that is configured to receive power from the motor/generator via a reefer power system. Other embodiments include a vehicle system in which two vehicles share one or more power components during certain operating conditions.

In one embodiment, the reefer power system includes an export power inverter connected to the motor/generator and an energy storage device. The energy storage device can be one of a low voltage and high voltage battery connected to the reefer unit. The reefer unit is further connected to the export power inverter and to the low voltage or high voltage battery with a DC/AC inverter. The export power inverter can also provide power from the motor/generator to charge the one of the low voltage and high voltage battery in response to certain operating conditions.

In another embodiment, the reefer power system includes a second internal combustion engine and second motor generator are connected to the reefer unit through a second inverter to supply a base power amount to the reefer unit from the second motor/generator and/or the energy storage device. The first motor/generator is connected to the battery of the reefer power system through the export power inverter to provide backup power, charge the battery, and/or supplement the power provided by the second engine and second motor/generator. In addition, the second motor generator is connectable to grid power to charge the battery or to directly supply power to the reefer unit. Further embodiments, forms, objects, features, advantages, aspects, and benefits shall become apparent from the following description and figures.

DETAILED DESCRIPTION

Figure 1:
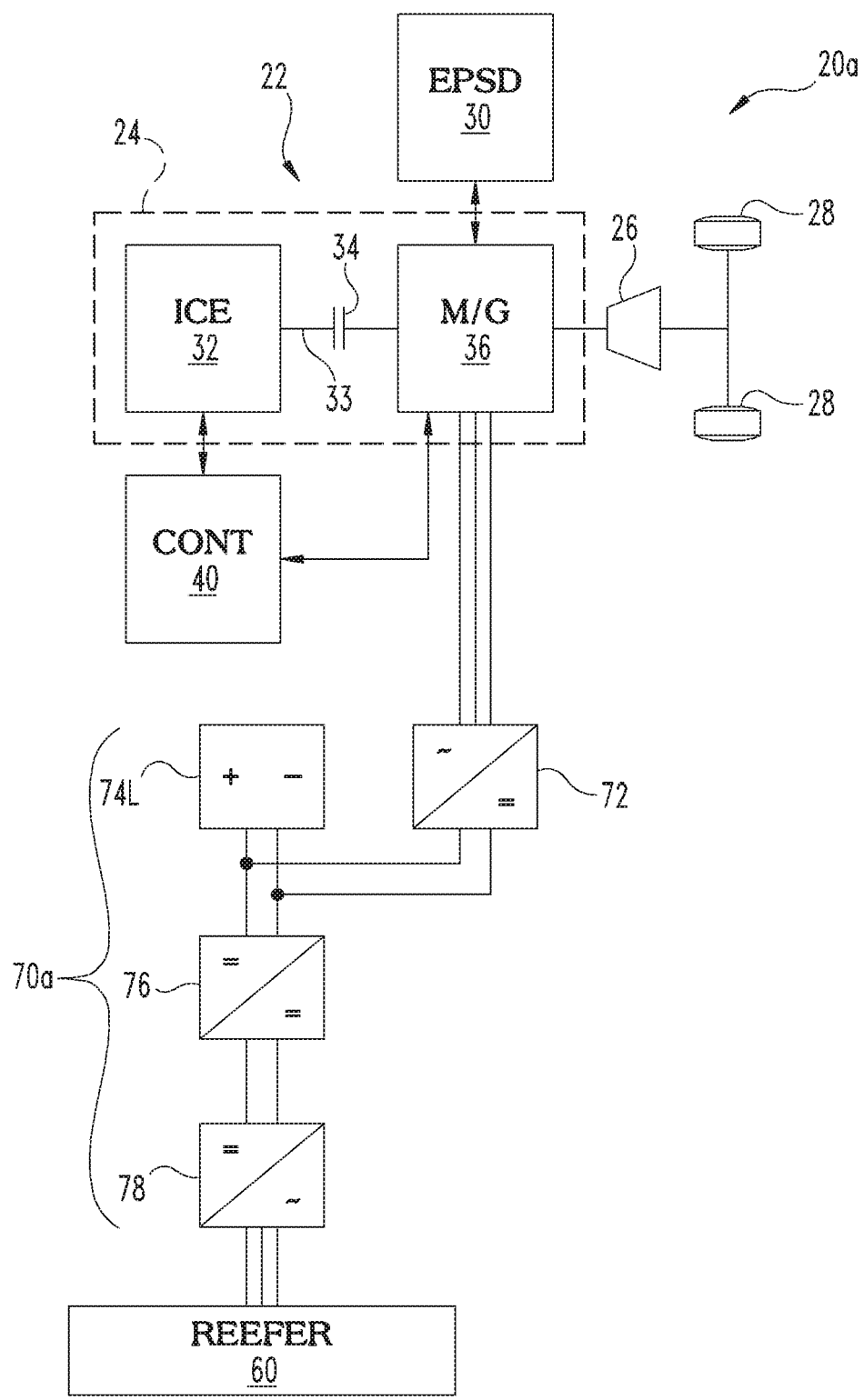
FIG. 1 illustrates a schematic view of a first embodiment of a hybrid reefer system.

With reference to FIG. 1 there is illustrated a partially diagrammatic view of a vehicle 20a including an example hybrid powertrain 22. It shall be appreciated that the configuration and components of vehicle 20a and of hybrid powertrain 22 are but one example, and that this disclosure contemplates that a variety of different hybrid vehicles and hybrid powertrain configurations and components may be utilized. For example, in the illustrated embodiment hybrid powertrain 22 includes a hybrid power system 24, a transmission 26, and ground engaging wheels 28. In other embodiments, hybrid powertrain 22 lacks ground engaging wheels 28, and is, for example, an engine-driven generator (a genset) that includes hybrid power system 24 for stationary applications.

Hybrid power system 24 is connected to a reefer unit 60 with reefer power system 70a. Reefer unit 60 may be any suitable reefer unit that includes a compressor and/or evaporator for providing refrigeration or cooling to an enclosed unit, such as a truck, trailer, stationary enclosure, or other suitable enclosure.

Depicted hybrid powertrain system 22 is a series-parallel hybrid (selectable with torque converter or clutch 34), although the system may be, without limitation, a parallel configuration, a series configuration, and/or a series-parallel hybrid system. It should be appreciated that in the illustrated embodiment, the propulsion of vehicle 20a is provided by the rear wheels 28; however in other applications front wheel drive and four/all-wheel drive approaches are contemplated. In various forms vehicle 20a is an on-road reefer truck and/or reefer trailer and/or reefer enclosure.

Hybrid power system 24 includes internal combustion engine 32, clutch 34, motor/generator 36, controller 40, and electrical power storage device (EPSD) 30. Hybrid power system 24 may also include an air handling subsystem, aftertreatment equipment, electrical power electronics devices, and a mechanical accessory drive subsystem, for example, which are not shown. Hybrid power system 24 is shown in the form of a parallel hybrid power source such that engine 32 and/or motor/generator 36 can provide torque for power train 22 depending on whether clutch 34 is engaged or not. It should be appreciated that motor/generator 36 can operate as a motor powered by electricity from power storage device 30, or as an electric power generator that captures electric energy. In other operating conditions, the motor/generator may be passive such that it is not operating at all. In one form, motor/generator 36 has a common rotor and a common stator, and is provided as an integrated unit; however in other embodiments a completely or partially separate motor, generator, rotor, stator, or the like may be employed. The designated motor/generator 36 is intended to encompass such variations. Furthermore it should be appreciated that in alternative embodiments of hybrid power system 24 some of these features, such as air handling subsystems, aftertreatment equipment, and/or mechanical accessory drive may be absent and/or other optional devices/subsystems may be included (not shown).

In certain embodiments the motor/generator 36 may comprise a hydraulic or pneumatic pump rather than an electric motor/generator. It shall be appreciated that references to a motor/generator herein are intended to encompass both electric motor/generators and non-electric motor/generators such as those comprising hydraulic or pneumatic pumps. Furthermore, power storage device 30 of hybrid power system 24 may comprise one or more electrochemical batteries, supercapacitors or ultracapacitors, or may alternatively store energy in a different, non-electrical medium such as an accumulator found in a hydraulic or pneumatic hybrid system. It shall be appreciated that references to a battery herein are intended to encompass electrochemical storage batteries, other electrical storage devices such as capacitors, and non-electrical energy storage devices such as accumulators utilized in hydraulic or pneumatic hybrid systems.

In the illustrated embodiment, engine 32 is of a four-stroke, diesel-fueled, compression-ignition (CI) type with multiple cylinders and corresponding reciprocating pistons coupled to a crankshaft 33, which typically would be coupled to a flywheel. Crankshaft 33 is mechanically coupled to controllable clutch 34. Engine 32 may be of a conventional type with operation modifications to complement operation in hybrid power system 24. In other embodiments, engine 32 may be of a different type, including different fueling, different operating cycle(s), different ignition, or the like.

Vehicle 20a further includes a controller 40 which may be configured to control various operational aspects of vehicle 20a and/or hybrid powertrain 22 and/or hybrid power system 24 as described in further detail herein. Controller 40 may be implemented in any of a number of ways. Controller 40 executes operating logic that defines various control, management, and/or regulation functions. This operating logic may be in the form of one or more microcontroller or microprocessor routines stored in a non-transitory memory, dedicated hardware, such as a hardwired state machine, analog calculating machine, various types of programming instructions, and/or a different form as would occur to those skilled in the art.

Controller 40 may be provided as a single component, or a collection of operatively coupled components; and may comprise digital circuitry, analog circuitry, or a hybrid combination of both of these types. When of a multi-component form, controller 40 may have one or more components remotely located relative to the others in a distributed arrangement. Controller 40 can include multiple processing units arranged to operate independently, in a pipeline processing arrangement, in a parallel processing arrangement, or the like. In one embodiment, controller 40 includes several programmable microprocessing units of a solid-state, integrated circuit type that are disturbed throughout system 30 that each include one or more processing units and non-transitory memory. For the depicted embodiment, controller 40 includes a computer network interface to facilitate communications using standard Controller Area Network (CAN) communications or the like among various system control units. It should be appreciated that the depicted modules or other organizational units of controller 40 refer to certain operating logic performing indicated operations that may each be implemented in a physically separate controller of controller 40 and/or may be virtually implemented in the same controller.

The description herein including modules and/or organizational units emphasizes the structural independence of the aspects of the controller, and illustrates one grouping of operations and responsibilities of the controller. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 40 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Controller 40 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

Controller 40 may be configured to perform a number of example control processes in which a total power and a power-split allocation can be determined and utilized in controlling one or more systems of hybrid powertrain 22 and/or vehicle 20a and/or reefer power system 70. Controller 40 may be configured to implement unique methodologies and processes for controlling hybrid vehicles, hybrid powertrains, and reefer power systems, including basic vehicle control, power-split optimization and energy management, and hardware protection.

Reefer power system 70a includes an export power inverter 72 connected to motor/generator 36 to receive AC power from motor-generator 36. Export power inverter 72 is connected to a low voltage bus that is connected to low voltage battery 74L. Low voltage battery 74L and export power inverter 72 are connected to DC/DC converter 76 with the low voltage bus. DC/DC converter steps up the voltage from the low voltage bus and outputs the voltage to a high voltage bus. DC/DC converter 76 is connected to reefer unit 60 through DC/AC inverter 78 with the high voltage bus. DC/AC inverter 78 may include an output filter to provide lower total harmonic distortion (THD).

Export power inverter 72 can be configured to directly produce regulated DC output power from motor/generator 36 at, for example, 325 VDC. Export power inverter 72 can be connected directly to the low voltage bus as shown, or connected directly to the high voltage bus from DC/DC converter 76. Low voltage battery 74L can also produce power at 325 VDC. This regulated DC power is provided to DC/DC converter for stepping up to 650 VDC, which is then inverted by DC/AC inverter 78 to provide AC power to reefer unit 60 at 380 Vac/50 Hz. Other output voltages and/or frequencies are also contemplated depending on the requirements of reefer unit 60.

In certain embodiments and/or operational conditions, export power inverter 72 can provide charging of battery 74L when AC power generation from motor/generator 36 is not required for other uses, such as powering accessories, and/or when grid power is unavailable. DC/AC inverter 78 is bi-directional and can import grid power for battery charging of low voltage battery 74L and/or powering accessory loads. The low voltage battery 74L allows two different DC bus voltages to be used to provide stabilized high voltage AC power to reefer unit 60. In addition, the non-isolated DC/DC converter 76 that interfaces with low voltage battery 74L enables the implementation of battery protection limits (voltage, current, power, thermal, etc.) to enhance battery life and system reliability. The DC/DC converter 76 also enables the export and/or import of AC power at higher voltages.

Figure 2:
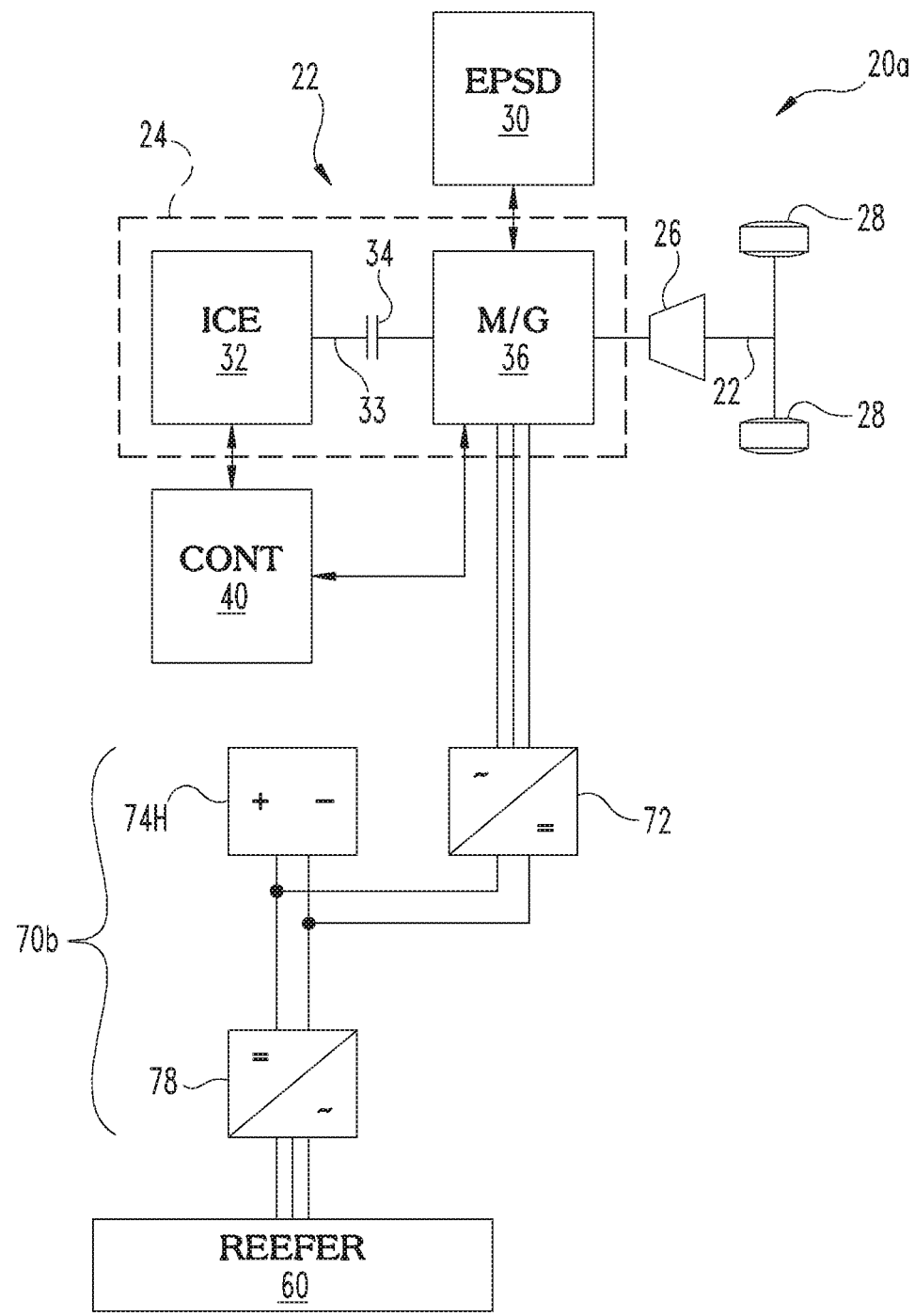
FIG. 2 illustrates a schematic view of a second embodiment of a hybrid reefer system.

FIG. 2 shows another embodiment of a reefer power system 70b that is similar to reefer power system 70, but includes a high voltage battery 74H. Export power inverter 72 and high voltage battery 74H are connected to a high voltage bus, and to reefer unit 60 through DC/AC inverter 78. Export power inverter 72 can be configured to directly produce regulated DC output power at, for example, 650 VDC. High voltage battery 74H can also produce power at 650 VDC. This regulated DC power is provided to DC/AC inverter 78 from the high voltage bus to produce AC power at 380 Vac/50 Hz for reefer unit 60. Other output voltages and/or frequencies are also contemplated depending on the requirements of reefer unit 60.

Figure 3:
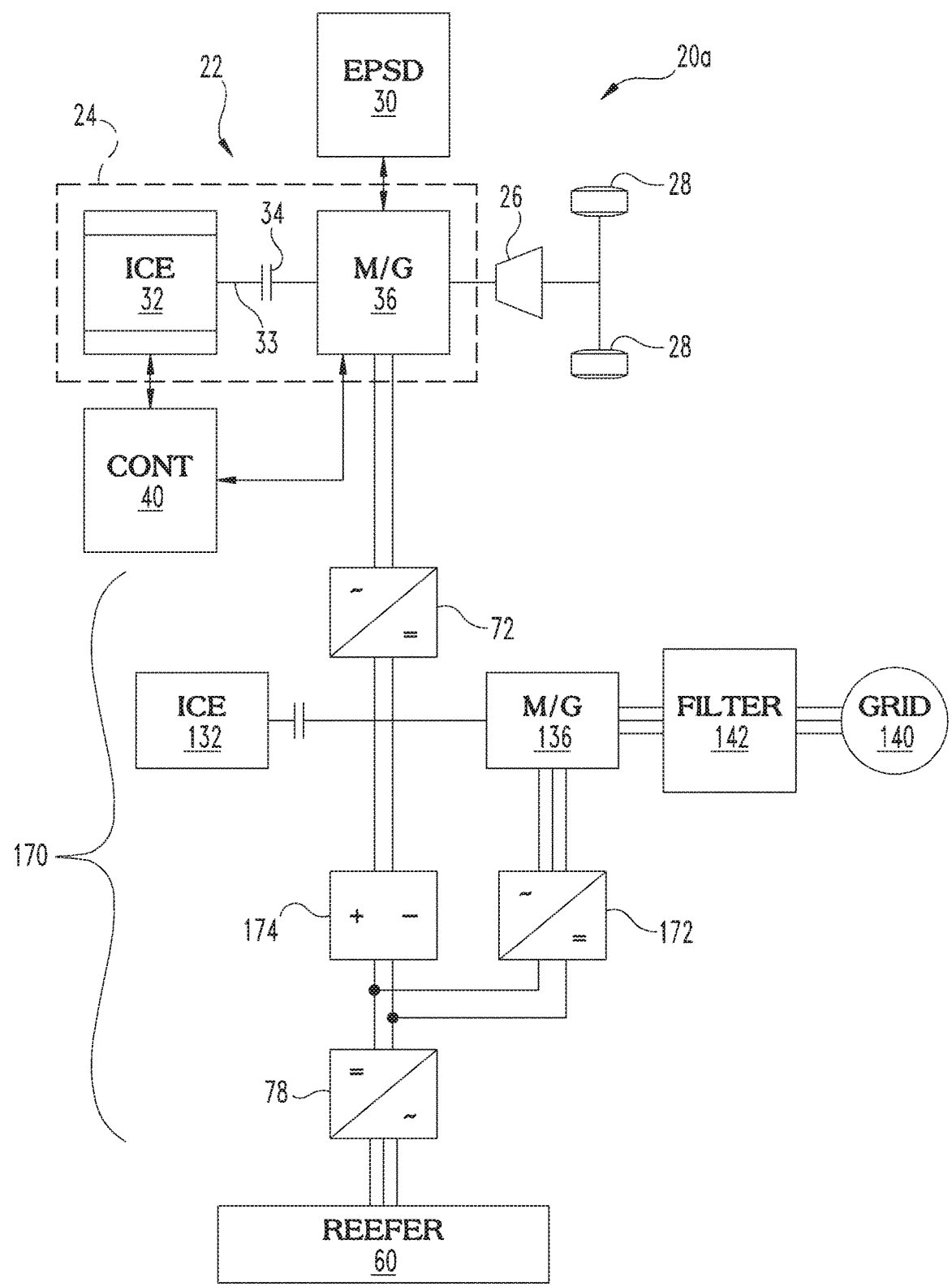
FIG. 3 illustrates a schematic view of a third embodiment of a hybrid reefer system.

FIG. 3 shows still another embodiment reefer power system 170 that connects hybrid power system 24 to reefer unit 60. Reefer power system 170 includes a second internal combustion engine 132 and a second motor/generator 136. Second motor/generator 136 is connected to second internal combustion engine 132 with a second clutch 134. Second motor/generator 136 is sized to satisfy a base load demand from reefer unit 60. Second internal combustion engine 132 is smaller/lower in power output than first engine 32. For example, second engine 132 can be 1 or 2 cylinders, while first engine 32 can be four or more cylinders.

First motor-generator 36 and second motor/generator 136 are connected to first export power inverter 72 and second power inverter 172, respectively. Second power inverter 172 is connected to battery 174 to provide charging of battery 174 under certain operating conditions or power to DC/AC inverter 78. Battery 174 and second power inverter 172 are connected to reefer unit 60 through DC/AC inverter 78. In other embodiments, a DC/DC converter can be provided such as discussed above with respect to FIG. 1 to provide a step up in voltage from the battery 174 and second power inverter 172.

Second motor-generator 136 can be connected to grid power 140 through filter 142. Grid power 140 can be used for charging battery 174 and/or to directly supply power to reefer unit 60 when grid power is available. In certain embodiments, the inverter(s) are bi-directional and grid power can be used to power vehicle accessory loads when engine 32 is off.

Figure 4:
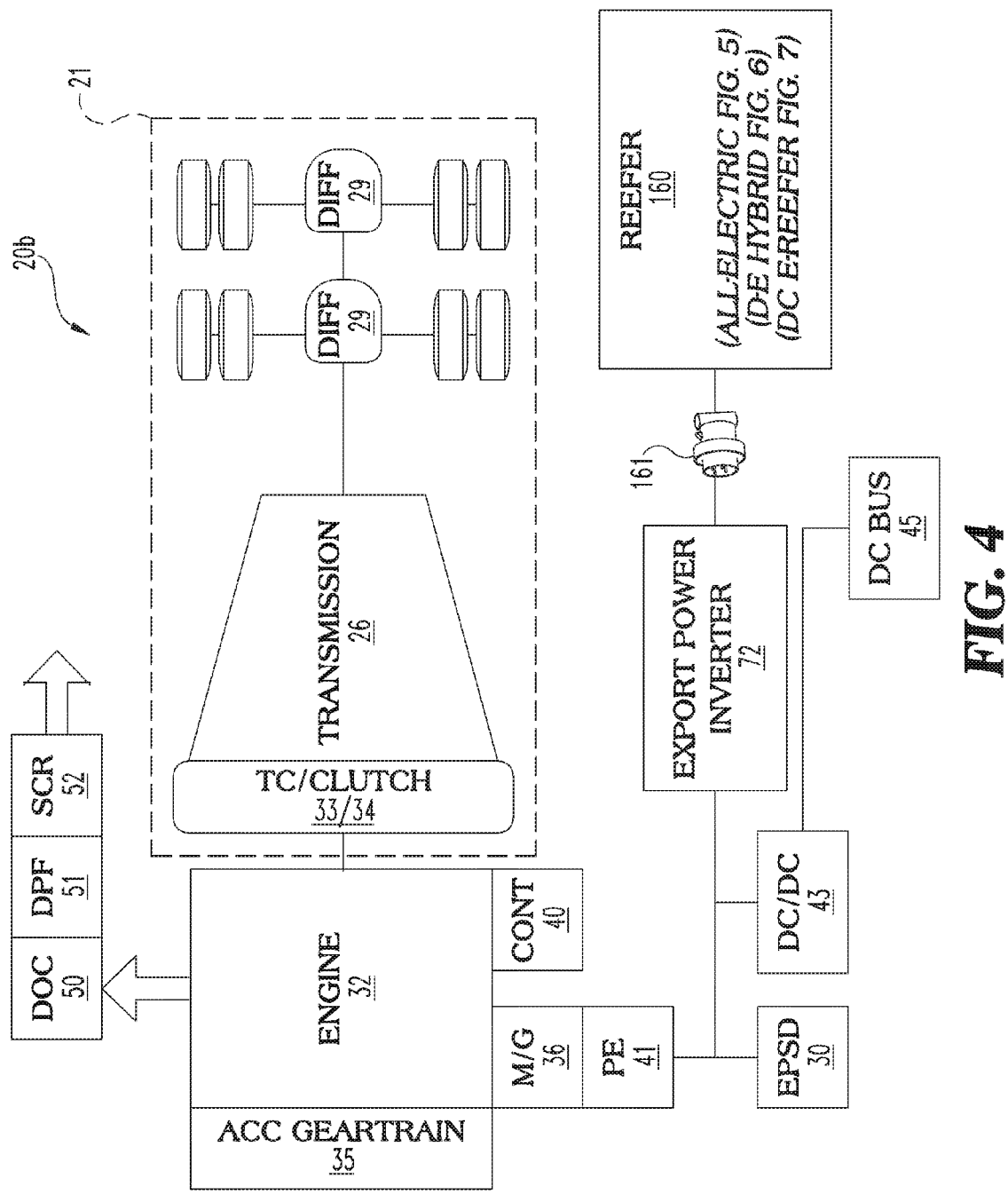
FIG. 4 illustrates a schematic view of a fourth embodiment of a hybrid reefer system.

FIG. 4 illustrates a diagrammatic view of a vehicle 20b including an example hybrid powertrain including components of vehicle 20a (FIGS. 1-3) as previously described herein for driving a vehicle load 21.

Vehicle 20b further includes in the FIG. 4 embodiment differentials 29, an accessory (ACC) geartrain 35, power electronics 41, DC/DC converter 43, 12V low voltage DC bus 45, a diesel oxidation catalyst 50, a diesel particular filter 51 and a selective catalytic reduction device 52.

A reefer unit 160 is powered via a shore power supply 161 by engine 32 of vehicle 20b as shown or an alternative power source (not shown). This embodiment primarily provides for the load requirements of reefer unit 160 electrically through engine 32. The trailer engine, such as engine 132, can be used for backup power when engine 32 is off or disconnected.

Figure 5:
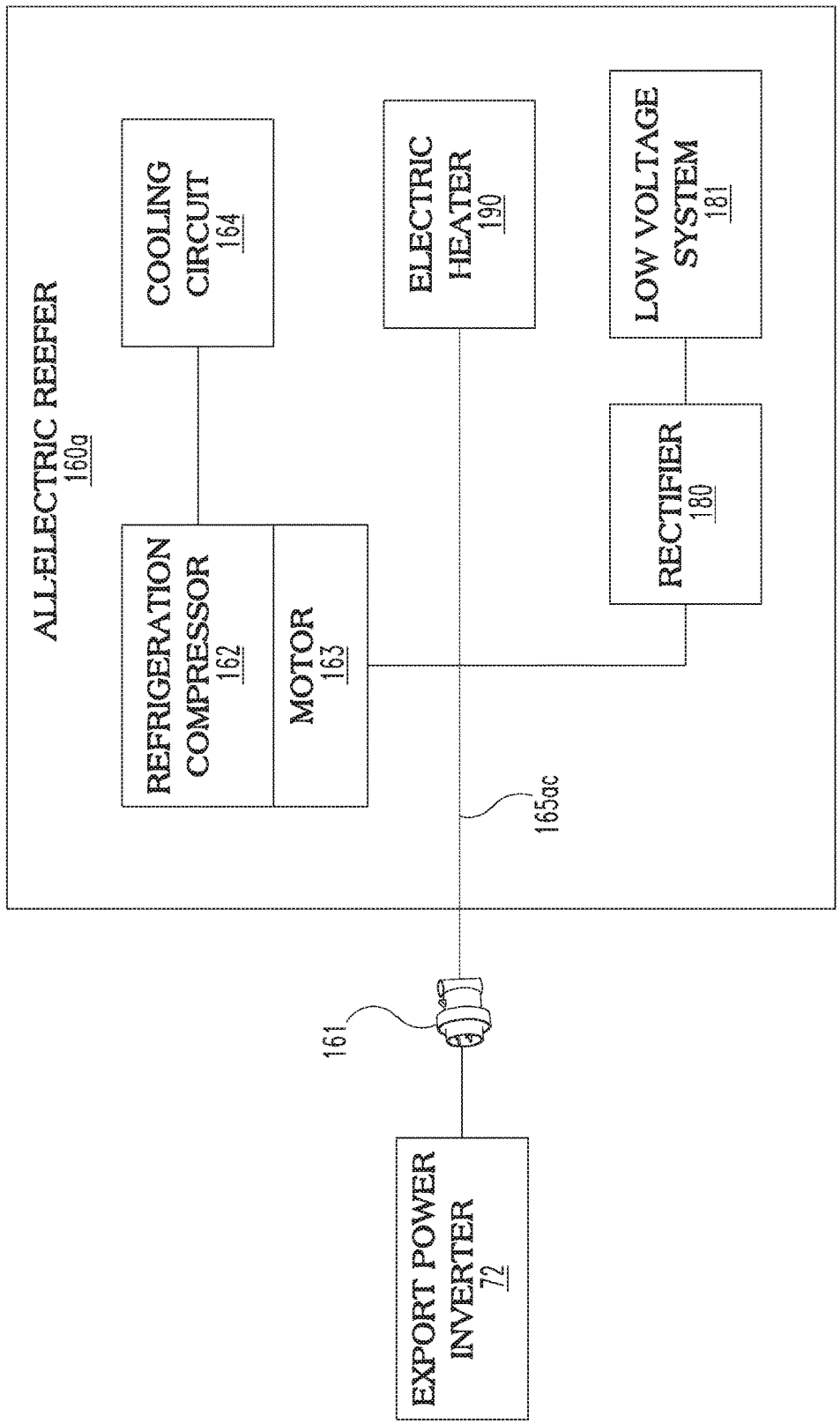
FIG. 5 illustrates a schematic view of an embodiment of all-electric reefer.

In one embodiment, reefer unit 160 is an all-electric reefer 160a as shown in FIG. 5. The all-electric reefer 160a provides a system in which the trailer engine can be eliminated.

Referring to FIG. 5, all-electric reefer 160a employs a reefer unit including refrigeration compressor 162 operated by a motor 163 to drive a cooling circuit 164. All-electric reefer 160a further employs a reefer power system including AC bus 165ac connecting shore power supply 161 to motor 163, an electric heater 190, and a rectifier 180. A low voltage system 181 establishes AC bus 165ac as a low voltage bus. Export power inverter 72 can be configured to directly produce regulated DC output as previously described herein (FIG. 1-3).

Figure 6:
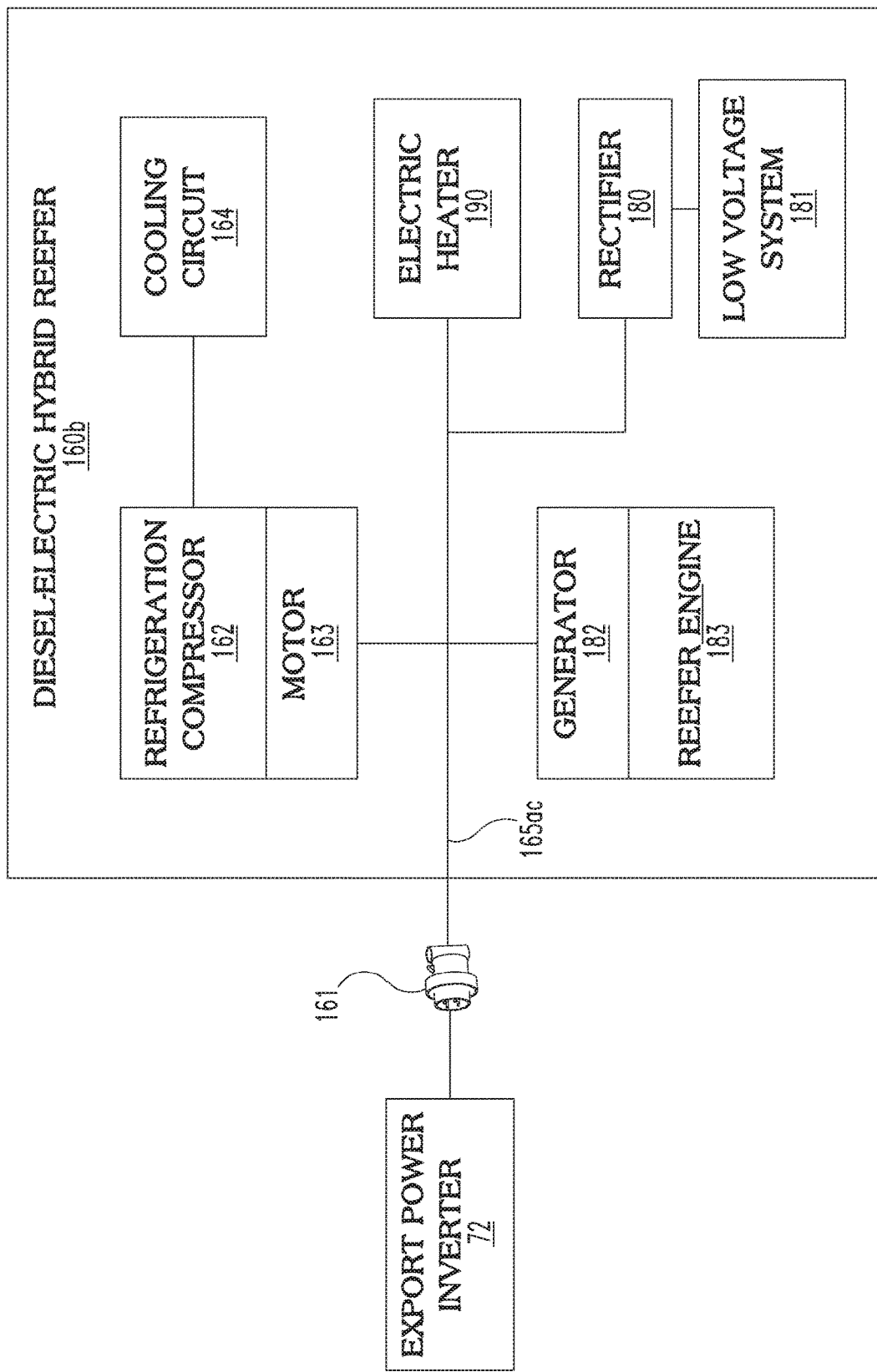
FIG. 6 illustrates a schematic view of an embodiment of a diesel-electric hybrid reefer.

In a second embodiment, reefer 160 is a diesel-electric hybrid reefer unit 160b as shown in FIG. 6 in which a reefer engine 183 is provided with reefer unit 160b.

Referring to FIG. 6, diesel-electric hybrid reefer unit 160b employs a refrigeration compressor 162 operated by motor 163 to drive cooling circuit 164. Diesel-electric hybrid reefer unit 160b further employs a reefer power system including an AC bus 165ac connecting shore power supply 161 to motor 163, an electric heater 190, and a generator 182 coupled to an engine 183. Low voltage system 181 and rectifier 180 are also provided. Alternatively, an alternator (not shown) may replace rectifier 180. Export power inverter 72 can be configured to directly produce regulated DC output as previously described herein (FIG. 1-3).

In the embodiments of FIGS. 5 and 6, the stored electrical power can also be used to provide propulsion assistance for the vehicle through EPSD 30 and/or auxiliary power to an auxiliary power unit such as may be provided to power a heating and air conditioning for a sleeper unit of the vehicle 20b. The export power 72/shore power supply 161 connection provide a common interface to switch between grid power and engine power for the associate reefer unit. The modular link also allows a slow charge link for any on-board power storage device and auxiliary power unit needs, while supporting multiple voltage levels, and can accommodate additional power supplies and sources such as solar cells, even at different primary bus voltages.

Figure 7:
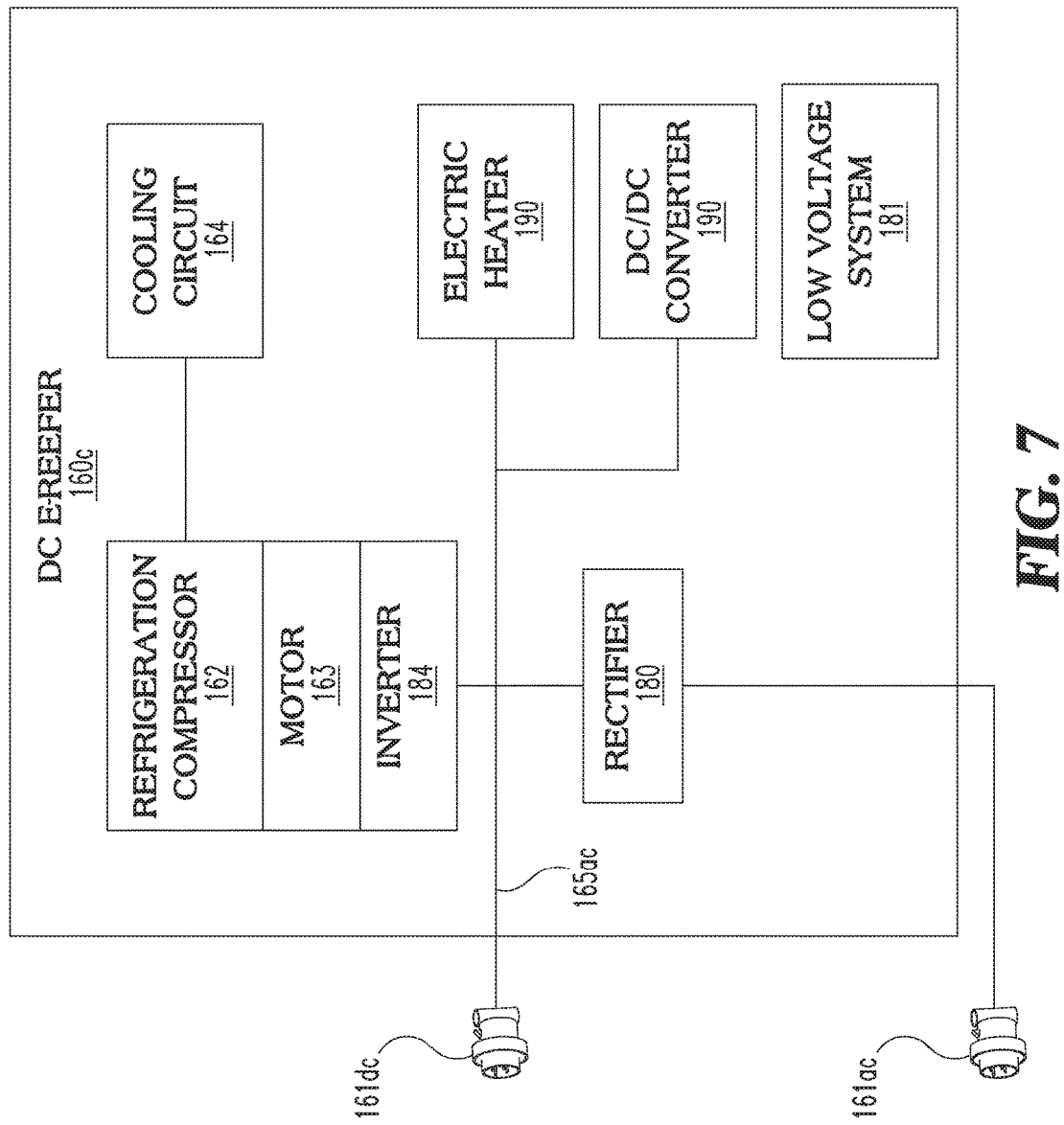
FIG. 7 illustrates a schematic view of an embodiment of a DC e-reefer.

In a third embodiment, reefer unit 160 (FIG. 4) is a vehicle powered DC e-reefer unit 160c as shown in FIG. 7. In FIG. 7 the export power converter/inverter 72 can be eliminated and the electric power storage devices can be distributed. Losses from DC/AC inverter and AC/DC rectifier operations are also eliminated.

Referring to FIG. 7, DC e-reefer unit 160c employs a reefer unit including refrigeration compressor 162 operated by motor 163 to drive cooling circuit 164. All-electric reefer unit 160c further employs a reefer power system including DC bus 165dc connecting a DC shore power supply 161dc to an inverter 184, electric heater 167, and rectifier 180. A low voltage system 181 and DC/DC converter 185 are also provided. Rectifier 180 is further connectable to an AC shore power supply 161ac.

Figure 8A:
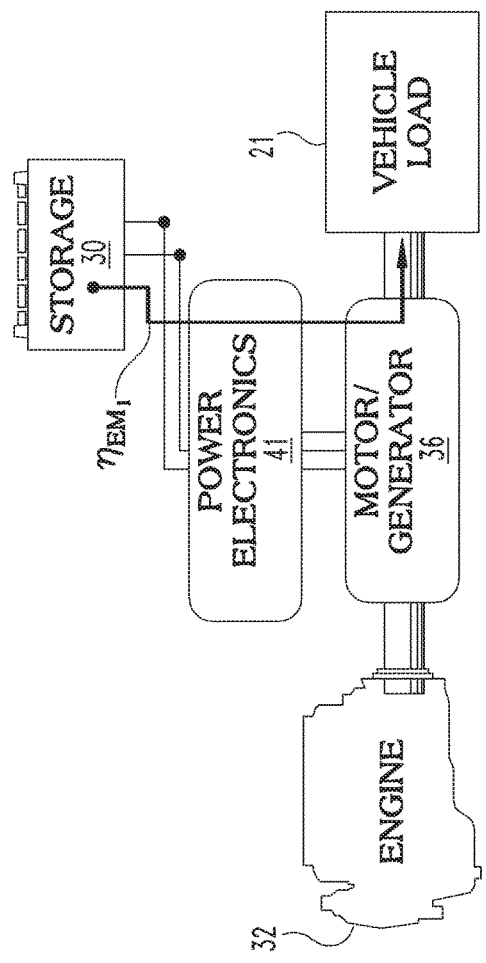
FIGS. 8A and 8B illustrate a schematic view of an electrical tractive hybrid system.

Referring back to FIG. 4, vehicle 20b also supports an electrical tractive or propulsive hybrid system. Specifically, referring to FIG. 8A, a torque assistance provides power (torque) into the driveline during propulsion events in accordance with the following equation 1:

$$\eta_{EM_i} = \eta_{Batt}^{Chem \to Elec} \cdot \eta_{PE_i}^{Elec \to Elec} \cdot \eta_{Motor_j}^{Elec \to Mech} \quad [1]$$

Figure 8B:
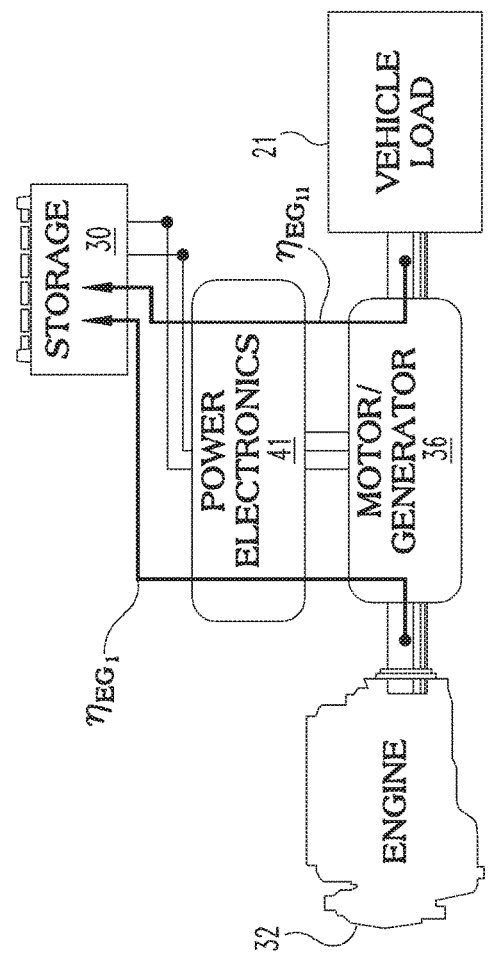

Referring to FIG. 8B, regeneration energy such as from braking is harnessed to store kinetic energy during braking/deceleration events in accordance with the following equation 2:

$$\eta_{EG_i} = \eta_{Batt}^{Elec \to Chem} \cdot \eta_{PE_i}^{Elec \to Elec} \cdot \eta_{Generator_j}^{Mech \to Elec} \quad [2]$$

Energy may be stored in a variety of electrical mediums, such as, for example, batteries, ultra/super capacitors, and other suitable energy storage devices and provided to the driveline during propulsion events.

Both torque assistance (FIG. 8A) and regeneration (FIG. 8B) are managed by controller 40 to maintain (1) optimal system performance, (2) a state of charge of EPSD 30 at a prescribed target and (3) life and durability of components within capability ranges.

In operation of one or more of the above embodiments, various control strategies to improved fuel and other operating efficiencies are contemplated. For example, the controller 40 can use e-horizon or dynamic environmental data from an intelligent transportation system or the like to modulate the temperature of the internal compartment cooled by the reefer unit to increase or decrease engine load in a controlled manner to maximize efficiency while maintaining cargo quality. Examples of dynamic environmental data include, for example, ambient temperature, humidity, terrain, traffic conditions, route conditions, platooning, etc.

For example, in a rolling terrain controller 40 can be configured to provide pre-cooling of the trailer via the reefer unit below a target temperature or by a certain amount during a downhill segment (e.g. one degree Celsius.) The trailer temperature can then be allowed to increase during an uphill segment so that additional engine power can be diverted from the reefer unit to the engine during the uphill segment, allowing the trailer temperature to increase back toward the target temperature or increase by a certain controlled amount (e.g. one degree Celsius.)

In another example, controller 40 can be configured to utilize braking energy from a downhill segment or other energy recovery condition. The energy can be stored and/or immediately re-used to provide power to the reefer unit during an uphill segment or other high load condition, allowing engine power to be diverted to propelling the vehicle during the uphill segment/high load condition and provide more optimal fuelling. In another example, the controller 40 can be configured to pre-cool the trailer with the reefer unit prior to a disconnection of the trailer of the vehicle for transfer to another vehicle or external power source.

Figure 9:
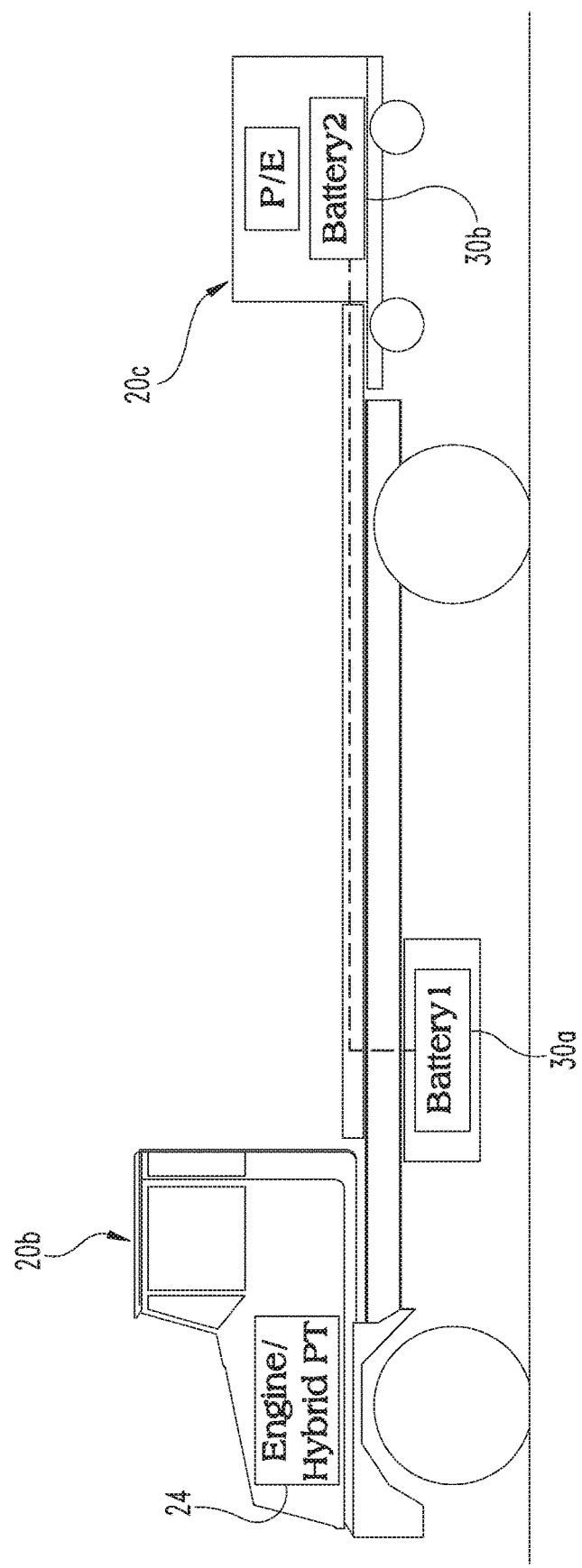
FIG. 9 illustrates an embodiment of a hybrid powered vehicle with an auxiliary vehicle.

In another embodiment such as shown in FIG. 9, the vehicle 20b is a delivery vehicle that is connected to an electrically powered auxiliary vehicle 20c. The auxiliary vehicle 20c is mounted to the vehicle 20b for transportation to and from various locations. In this embodiment, each of the vehicles 20b and 20c includes an electrical power storage device, such EPSDs 30a and 30b, respectively. When auxiliary vehicle 20c is mounted to vehicle 20b during transit, the EPSDs 30a, 30b are connected and shared to provide maximum energy storage capacity for hybrid vehicle operation of vehicle 20b. Thus, energy from each or either of the EPSDs 30a, 30b can be used to propel vehicle 20b. When the auxiliary vehicle 20c is dismounted from vehicle 20b, the EPSD 30b powers auxiliary vehicle 20c for operation autonomously from vehicle 20b.

Controller 40b can be configured to maintain EPSD 30b at a state of charge sufficient to allow auxiliary vehicle 20c to perform its function when dismounted from vehicle 20b. For example, in one embodiment auxiliary vehicle 20c is a forklift and vehicle 20b is a delivery vehicle. Other embodiments contemplate that auxiliary vehicle 20c is a lawn-mower, equipment carrier, or other auxiliary vehicle that is transported by an on-highway vehicle such as vehicle 20b. The shared EPSDs 30a, 30b allow for a smaller EPSD 30a to be provided with vehicle 20b. In addition, a mix of performance characteristics for the EPDS's 30a, 30b can be employed, such as EPSD 30a having higher power than EPSD 30b and EPSD 30b having higher energy than EPSD 30a.

According to one aspect of the present disclosure, a hybrid reefer system includes a hybrid power system with an internal combustion engine and a motor/generator connectable with the internal combustion engine, a reefer unit, and a reefer power system connecting the motor/generator with the reefer unit with at least an export power inverter to receive unregulated input power from the motor/generator and provide regulated output power to the reefer unit.

In one embodiment, the reefer power system includes a battery and a DC/AC inverter, the DC/AC inverter connecting the battery and the export power inverter to the reefer unit. In a further embodiment, the DC/AC inverter includes an output filter to reduce total harmonic distortion. In another further embodiment, the battery is a high voltage battery. In another further embodiment, the battery is a low voltage battery. In yet a further embodiment, the reefer power system includes a DC/DC converter connecting the low voltage battery and the DC/AC inverter.

In another embodiment, the reefer power system includes a second internal combustion engine, a second motor/generator connectable to the second internal combustion engine, and a second export power inverter connected to receive power from the second motor/generator and supply power to the reefer unit. The reefer power system includes a battery connected to supply power to the reefer unit, and the battery is also connected to the first motor/generator through the export power inverter to receive power from the first motor/generator. In a further embodiment, the second motor/generator is connected to grid power. In still a further embodiment, the reefer power system includes a DC/AC inverter, and the DC/AC inverter is connected between the reefer unit and the battery and the second export power inverter to receive power from both the battery and the second export power inverter.

In another embodiment, the hybrid power system is operable to propel a vehicle. In yet another embodiment, the hybrid power system is operable to power a genset. In yet another embodiment, the hybrid power system includes a controller configured to modulate a temperature of the reefer unit in response to dynamic environmental data.

According to another aspect, a vehicle system includes a first vehicle including a hybrid power system and a first electrical power storage device. The system also includes a second vehicle mounted to the first vehicle. The second vehicle includes a second electrical power storage device that is electrically connected to the first electrical power storage device. The second electrical power storage device is disconnected from the first electrical power storage device and provides power for propulsion of the second vehicle with the second vehicle dismounted from the first vehicle.

In one embodiment, the second vehicle is an electric vehicle. In another embodiment, the first vehicle is a delivery vehicle.

It shall be understood that the example embodiments summarized and described in detail and illustrated in the figures are illustrative and not limiting or restrictive. Only certain example embodiments have been shown and described, and all changes and modifications that come within the scope of the invention are specifically contemplated herein, and are to be protected. It shall be appreciated that the embodiments and forms described above may be combined in certain instances and may be exclusive of one another in other instances. Likewise, it shall be appreciated that the embodiments and forms described above may or may not be combined with other aspects and features. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A hybrid reefer system, comprising:
   a hybrid power system including an internal combustion engine and a motor/generator connectable with the internal combustion engine;
   a reefer unit; and
   a reefer power system connecting the motor/generator with the reefer unit, the reefer power system including with at least an export power inverter to receive unregulated input power from the motor/generator and provide regulated output power to the reefer unit, the reefer power system further including a battery and a DC/AC inverter, wherein the DC/AC inverter connects the reefer unit to each of the battery and the export power inverter.

2. The hybrid reefer system of claim 1, wherein the DC/AC inverter includes an output filter.

3. The hybrid reefer system of claim 1, wherein the battery is a high voltage battery.

4. The hybrid reefer system of claim 1, wherein the battery is a low voltage battery.

5. The hybrid reefer system of claim 4, wherein the reefer power system includes a DC/DC converter connecting the low voltage battery and the DC/AC inverter.

6. A hybrid reefer system, comprising:
   a hybrid power system including an internal combustion engine and a motor/generator connectable with the internal combustion engine;
   a reefer unit; and
   a reefer power system connecting the motor/generator with the reefer unit, the reefer power system including with at least an export power inverter to receive unregulated input power from the motor/generator and provide regulated output power to the reefer unit, wherein the reefer power system includes:
   a second internal combustion engine;
   a second motor/generator connectable to the second internal combustion engine;
   a second export power inverter connected to receive power from the second motor/generator and supply power to the reefer unit; and
   wherein reefer power system includes a battery connected to supply power to the reefer unit, the battery also connected to the first motor/generator through the export power inverter to receive power from the first motor/generator.

7. The hybrid reefer system of claim 6, wherein the second motor/generator is connected to grid power.

8. The hybrid reefer system of claim 6, wherein the reefer power system includes a DC/AC inverter, the DC/AC inverter connected between the reefer unit and the battery and the second export power inverter to receive power from both the battery and the second export power inverter.

9. The hybrid reefer system of claim 1, wherein the hybrid power system is operable to propel a vehicle.

10. The hybrid reefer system of claim 1, wherein the hybrid power system is operable to power a genset.

11. The hybrid reefer system of claim 1, wherein the reefer power system includes a shore power supply connected to the export power inverter.

12. The hybrid reefer system of claim 1, wherein the reefer power system includes a rectifier connected between the reefer unit and a low voltage battery.

13. The hybrid reefer system of claim 1, wherein the reefer power system includes an electric heater connected to the reefer unit.

14. A hybrid reefer system, comprising:
    a hybrid power system including an internal combustion engine and a motor/generator connectable with the internal combustion engine;
    a reefer unit; and
    a reefer power system connecting the motor/generator with the reefer unit with at least an export power inverter to receive unregulated input power from the motor/generator and provide regulated output power to the reefer unit, wherein the reefer power system includes a generator and a reefer engine, the generator being connected between the reefer unit and the reefer engine.

15. The hybrid reefer system of claim 1, wherein the reefer unit includes a motor and a refrigeration compressor, the motor being connected between the reefer power system and the refrigeration compressor.

16. The hybrid reefer system of claim 1, wherein the hybrid power system includes a controller configured to modulate a temperature of the reefer unit in response to dynamic environmental data.

17. A vehicle system, comprising:
    a first vehicle including a hybrid power system and a first electrical power storage device; and a second vehicle mounted to the first vehicle, the second vehicle including a second electrical power storage device that is electrically connected to the first electrical power storage device, and the second electrical power storage device is disconnected from the first electrical power storage device and provides power for propulsion of the second vehicle with the second vehicle dismounted from the first vehicle, wherein the first and second electrical power storage devices share electrical power for operation of the first vehicle with the second vehicle mounted to the first vehicle, and wherein the first electrical power storage device includes a higher power performance characteristic than the second electrical power storage device and the second electrical power storage device includes a higher energy performance characteristic than the first electrical power storage device.

18. The vehicle system of claim 17, wherein the second vehicle is an electric vehicle.

19. The vehicle system of claim 17, wherein the first vehicle is a delivery vehicle.

* * * * *